United States Patent
Kawai

Patent Number: 5,149,284
Date of Patent: Sep. 22, 1992

[54] EXHAUST SYSTEM FOR AN OUTBOARD MOTOR

[75] Inventor: Takaji Kawai, Hamamatsu, Japan

[73] Assignee: Sanshin Kogyo Kabushiki Kaisha, Hamamatsu, Japan

[21] Appl. No.: 684,681

[22] Filed: Apr. 11, 1991

[30] Foreign Application Priority Data

Apr. 12, 1990 [JP] Japan .................. 2-97078

[51] Int. Cl.⁵ .......................... B63H 5/12
[52] U.S. Cl. .................... 440/52; 440/88; 440/89
[58] Field of Search ........... 440/52, 88, 89; 60/312, 60/314, 320, 322

[56] References Cited

U.S. PATENT DOCUMENTS

| | | | |
|---|---|---|---|
| 2,875,787 | 3/1959 | Evans | 181/233 |
| 2,916,007 | 12/1959 | Kiekhaefer | 440/52 |
| 3,310,022 | 3/1967 | Kollman | 440/89 X |
| 3,520,270 | 7/1970 | Miller | 440/89 |
| 4,145,988 | 3/1979 | Harada | 115/73 |
| 4,303,401 | 12/1981 | Sanmi et al. | 440/88 |
| 4,583,953 | 4/1986 | Nakase | 440/52 |
| 4,607,723 | 8/1986 | Okazi | 181/272 |
| 4,723,926 | 2/1988 | Uehara | 440/52 |
| 4,963,110 | 10/1990 | Otani et al. | 440/89 |

FOREIGN PATENT DOCUMENTS

| | | | |
|---|---|---|---|
| 80994 | 5/1982 | Japan | 440/89 |
| 58-185398 | 10/1983 | Japan | . |
| 60-30415 | 2/1985 | Japan | . |
| 60-73010 | 4/1985 | Japan | . |
| 63-103796 | 5/1988 | Japan | . |
| 6424109 | 1/1989 | Japan | . |

*Primary Examiner*—Sherman Basinger
*Attorney, Agent, or Firm*—Ernest A. Beutler

[57] ABSTRACT

This invention is adapted to be embodied in an outboard motor that is comprised of a power head having an internal combustion engine surrounded by a protective cowling. The engine includes an exhaust port in communication with an exhaust pipe for discharging exhaust gases from the engine. A steering shaft is affixed to the drive shaft housing by upper and lower connections which include elastic bushings. An upper reservoir receives cooling water from the engine to cool structures adjacent the exhaust pipe and specifically the elastic bushings. The reservoir is dammed up on the forward side by the bushing and receives cooling from the cooling water.

12 Claims, 7 Drawing Sheets

EXHAUST SYSTEM FOR AN OUTBOARD MOTOR

This invention relates to a wettably cooled bushing for an outboard motor, and more particularly to wettable cooling at the point of engagement of the drive shaft housing to the steering shaft in an outboard motor.

As is well known, it is desirable, if not necessary, to silence and cool the exhaust gases issuing from the exhaust ports of an internal combustion engine before they are discharged to the atmosphere. The compactness of an outboard motor makes it extremely difficult to provide effective silencing and cooling for exhaust gases under all running conditions, especially to the extent necessary to protect portions of the outboard motor from exposure to the heat generated by the exhaust gasses. Generally, outboard motors include a power head and a drive shaft housing/lower unit supported by a steering shaft, which is in turn supported by a swivel bracket attached to the transom of a boat. An expansion chamber is formed in the drive shaft housing to which exhaust gases are delivered from the exhaust ports of the engine. As a result, substantially all of the silencing and cooling for the exhaust gases must be performed in the drive shaft housing. In some instances, there are provided expansion and silencing devices in a spacer plate that connects the engine to the drive shaft housing.

Further, the lack of early cooling of exhaust gases as they enter the drive shaft housing results in areas of elevated temperature especially near the point of transition from the power head to the drive shaft housing. The point of structural support between the drive shaft housing and steering shaft lies adjacent this point of the path of exhaust gasses entering the drive shaft housing, and therefore lies at the higher temperature portion of the exhaust gas path.

There is also usually provided means for providing sealing between the drive shaft housing and the power head assembly in order that the exhaust gases are sealingly transferred from the power head to the drive shaft housing along an exhaust path referred to as a high speed under water discharge. High temperatures are also normally present at the point of sealing engagement between the power head and drive shaft housing.

Outboard motors typically utilize elastomeric members at several points in their structure to provide sealing, silencing, and to attenuate the transmission of vibration. Exposure of these elastomeric members to high temperature results in degradation of those elastomeric members. Further, the thermal cycling due to the transition from the higher temperature running condition and the lower temperature stopped and inactive condition produces further stress on the elastomeric members causing an even further rapid elastomeric denigration.

Therefore, what is needed is an outboard motor having an exhaust and cooling system configured to provide for cooled sealing and vibration damping structures during operation of the outboard motor in order to extend the effective life of the elastomeric members used in those structures.

SUMMARY OF THE INVENTION

This invention is adapted to be embodied in an outboard motor that is comprised of a power head having an internal combustion engine surrounded by a protective cowling. The engine includes an exhaust port in communication with an exhaust pipe for discharging exhaust gases from the engine.

A steering shaft is affixed to the drive shaft housing by upper and lower connections which include elastic bushings. An upper reservoir receives cooling water from the engine to cool structures adjacent the exhaust pipe and specifically the elastic bushings. The reservoir is dammed up on the forward side by the bushing and receives cooling from the cooling water.

DETAILED DESCRIPTION OF THE PREFERRED EMBODIMENTS

Figure 1:
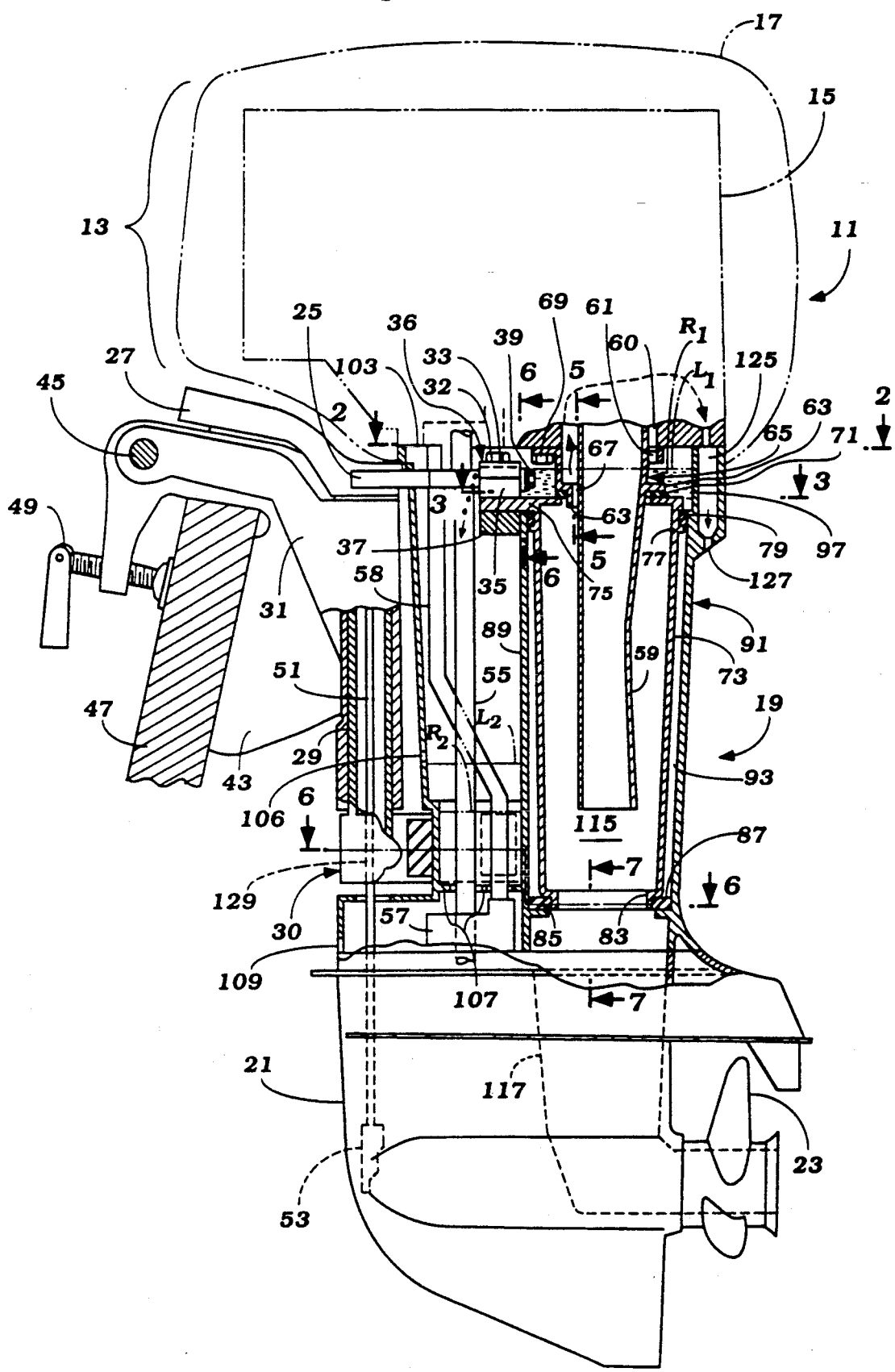
FIG. 1 is a side elevational view of an outboard motor constructed in accordance with the invention, with portions broken away and other portions shown in section.

Referring first to FIG. 1, an outboard motor constructed in accordance with this embodiment of the invention is identified generally by the reference numeral 11. The outboard motor is comprised of a power head indicated generally by the reference numeral 13, which is comprised of an internal combustion engine 15, shown in rectangular dashed box format, and a protective cowling and upper cover portions illustrated collectively in dashed line format and referred to by the reference numeral 17.

The engine 15 may be of any known type and may be of the inline, two or three cylinder, two cycle crankcase compression type that is usually comprised of details not shown in FIG. 1, including cylinder block, pistons, and an exhaust manifold. Other details of the internal combustion engine 15, which are similarly not shown, include provision of a path for cooling water from a cooling water system, the cooling water system to be described later.

This invention deals primarily with the cooling of heat produced by the exhaust system of internal combustion engine 15 and, therefore, the specific details of the construction of the internal components of the engine are not believed to be necessary to understand the invention and, for that reason, further description of the basic engine components is not believed to be necessary.

To the power head 13 portion of the outboard motor 11 of the present invention is fixably attached a drive shaft housing 19. At the lower end of drive shaft housing 19 is attached a lower unit 21. Lower unit 21 rotatably supports a propeller 23 which makes contact with the surrounding water to provide propulsion therein. Outboard motor 11 includes an upper steering plate 25 fixed to a tiller 27 and to a steering shaft 29 which is journaled by a swivel bracket 31.

The lower end of the steering shaft 29 is be affixed to a forward portion 30 of drive shaft housing 19. Referring to FIG. 1, the forward portion 30 of driveshaft housing 19 is somewhat isolated from the main body of driveshaft housing 19 both aftwardly and downwardly of forward portion 30. This configuration helps to isolate vibration in the driveshaft housing 19 from transmission through the steering shaft 29.

Figure 2:
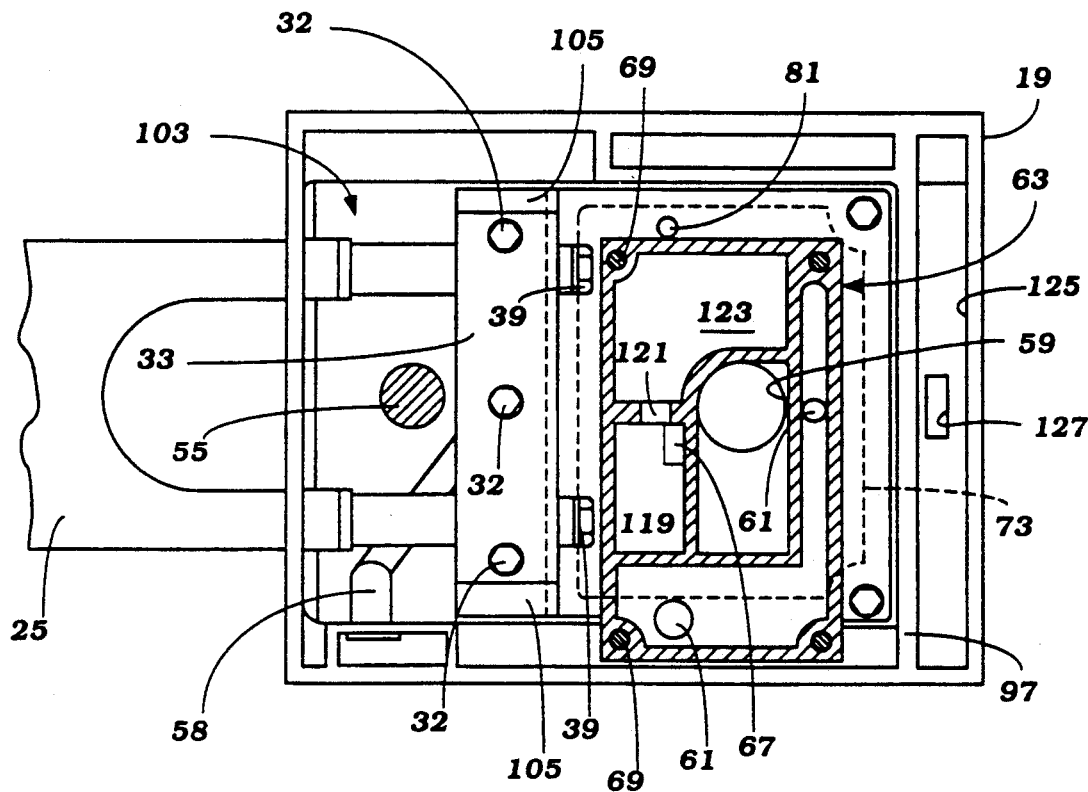
FIG. 2 is an enlarged cross sectional view taken along the line 2—2 of FIG. 1.
Figure 3:
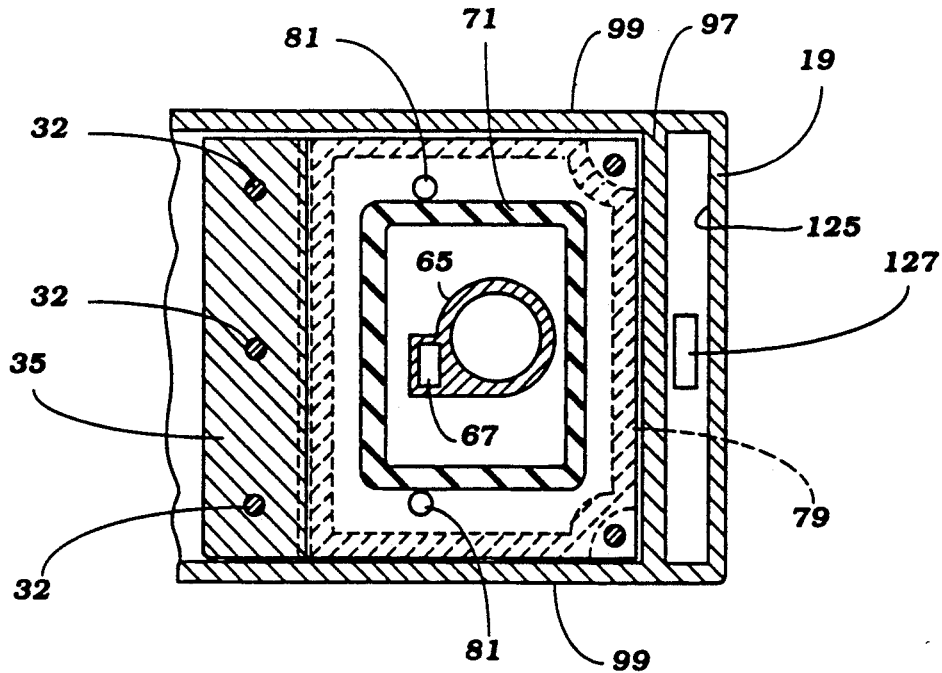
FIG. 3 is an enlarged cross sectional view taken along the line 3—3 of FIG. 1.
Figure 4:
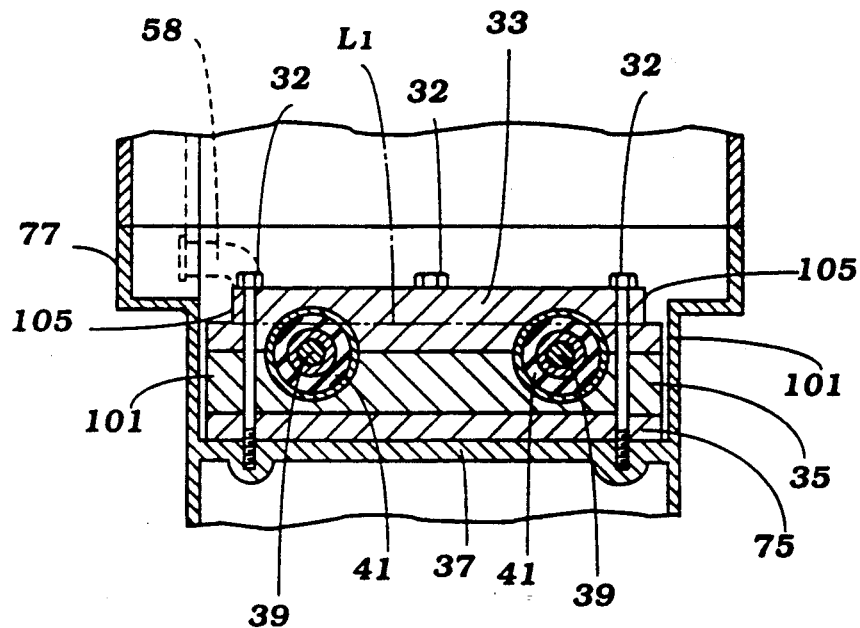
FIG. 4 is an enlarged cross sectional view taken along line 4—4 of FIG. 1.

Referring to FIGS. 1, 2, and 4, at the middle upper portion driveshaft housing it can be seen that bolts 32 join an upper plate 33 onto a lower plate 35 to form a housing 36. Bolts 32 further extend through flange 75 and into a block 37. Block 37 is continuous with drive shaft housing 19 and thus provides structural support between the drive shaft housing 19 and the aforementioned structures bolted to it.

Referring to FIG. 4, it can be seen that a set of bolts 39 extend axially through an annularly cylindrically shaped elastomeric bushing 41 and into upper steering plate 25. Housing 36 surrounds the annularly cylindrically shaped elastomeric bushing 41. In this manner, vibration of the driveshaft housing 19 which is transmitted into the housing 36 will be somewhat attenuated before reaching bolts 39 and upper steering plate 25.

Swivel bracket 31 is connected to a clamp bracket 43 by means of a pivot pin 45. Clamp bracket 43 is secured to the transom 47 of a boat by means of one or more threaded clamping devices 49. The pivoting movement between clamp bracket 43 and swivel bracket 31 about the pivot pin 45 enables the outboard motor 11 to be tilted upwardly out of the water while still clamped to the transom 47 of a boat. The drive shaft housing 19 accommodates several systems within its volume. At the forwardmost portion of drive shaft housing 19 is a forward/neutral/reverse transmission assembly gearshift rod 51 which extends through steering shaft 29 and into the lower unit 21. At the end of forward-reverse gearshift rod 51 is a gearshift cam 53. Forward, neutral, and reverse gear shifting is accomplished through gearshift rod 51 and gearshift cam 53 in a well known manner.

About one-third way towards the aft portion of drive shaft housing 19 is the drive shaft 55. Drive shaft 55 is drivably connected to internal combustion engine 15 at its upper end and drivably connected to a propeller shaft (not shown) which drives propeller 23 at its lower end.

With regard to both cooling and exhaust handling, a water pump 57 is interposed between the drive shaft housing 19 and the lower unit 21 and is driven by the drive shaft 55. The water pump 57 draws water from the body of water in which the watercraft is operating through an inlet (not shown) and delivers it to a cooling jacket (not shown) of the internal combustion engine 15 through a conduit 58. Cooling water from conduit 58 circulates through internal combustion engine 15 through paths not shown in FIG. 1 where the cooling water takes on excess thermal energy from internal combustion engine 15.

Exhaust gases from internal combustion engine 15 continue through an exhaust pipe 59 as shown in FIG. 1. In the particular embodiment of the present invention, the associated cooling water, after having absorbed the excess thermal energy from internal combustion engine 15, flows through a passage 60, adjacent exhaust pipe 59. Passage 60, within power head 13, is in communication with a short passage 61, located below power head 13, just within the upper part of the drive shaft housing 19, and adjacent exhaust pipe 59. Continuous with the upper portion of exhaust pipe 59 is a flange 63 which continuously encircles an upper end 65 of exhaust pipe 59. The fore end of flange 63 includes a low speed exhaust gas aperture 67 which is a small space between flange 63 and exhaust pipe 59. The upper end of flange 63 is bolted to a portion of the power head by a bolt 69.

A portion of the downwardly facing surface of flange 63 engages a sealing member 71. Sealing member 71 may be made of a rubber or elastomeric type material which is deformable to form a sealed boundary. The downward facing surface of sealing member 71 sealingly engages the upwardly facing surface of an expansion chamber 73.

Expansion chamber 73 is a hollow, cylindrically shaped chamber with open ends. Expansion chamber 73 has a forwardly located flange 75. Expansion chamber 73 encompasses a larger cross sectional area at the end nearer flange 75 than at the opposite end to facilitate its entry into drive shaft housing 19.

Figure 5:
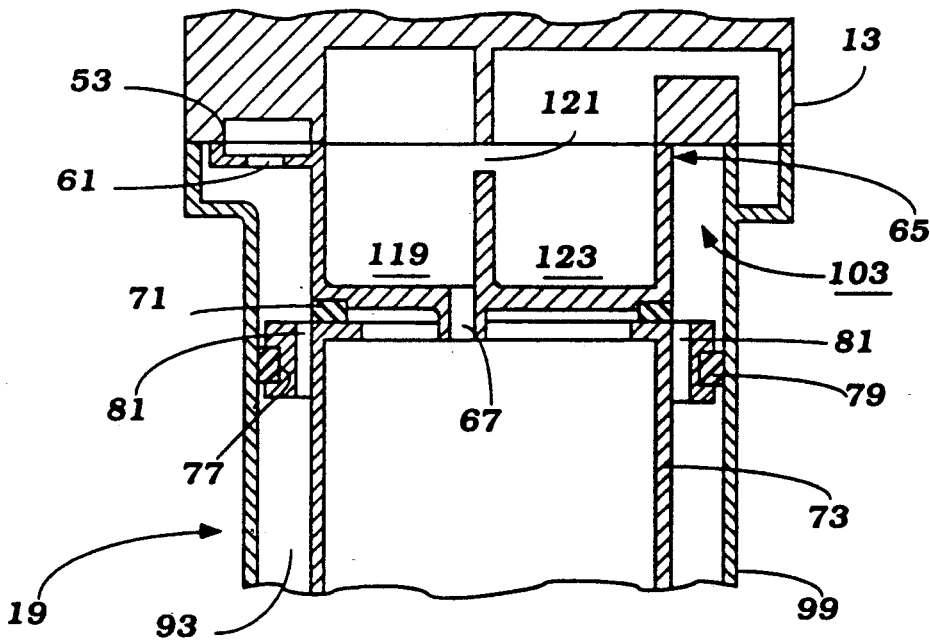
FIG. 5 is an enlarged cross sectional view taken along the line 5—5 of FIG. 1.

A circumferentially outwardly disposed slot 77 extends about the outer periphery of the upper, or flange end of expansion chamber 73, is adapted to support a sealing member 79. Referring to FIG. 5, at the port and starboard sides of outboard motor 11, a pair of apertures 81 are provided between the expansion chamber 73 and the slot 77. At the lower end of expansion chamber 73, opposite the flange end, a reduced perimeter opening 83 provides a circumferentially outwardly and downwardly extending groove 85 engagable with a sealing member 87.

Forward of expansion chamber 73 is a vertically extending dividing wall 89. From the port and starboard sides of expansion chamber 73 and extending from one edge to the other of dividing wall 89, is a vertical end wall 91 which also forms a portion of the exterior of drive shaft housing 19. As can be seen from FIG. 1, expansion chamber 73 is securably and sealably fittable within drive shaft housing 19 between vertical dividing wall 89 and vertical end wall 91, the sealing and support occurring at the upper and lower ends of expansion chamber 73. An annular space 93 is formed between the outside of expansion chamber 73 and the surfaces formed by the inside of vertically dividing wall 89 and vertical end wall 91.

Referring to FIGS. 1-3, 4 and 5, greater details of areas of outboard motor 11 adjacent the boundary between the power head 13 and drive shaft housing 19 are illustrated. Once cooling water passes through short passage 61, it collects in a reservoir $R_1$ formed about the upper end 65 of exhaust pipe 59 and its flange 63, and the top, upper end of expansion chamber 73. The level of reservoir $R_1$ is designated by the letter $L_1$. The level $L_1$ is achieved partially by virtue of the containment provided by the structures within drive shaft housing 19, including an inner wall 97 and side walls 99.

The forward end of the reservoir $R_1$ is further defined by upper and lower plates 33 and 35 forming housing 36, and by flange 75. Note, with reference to FIG. 4, that a pair of narrow slits 101 are formed between the sides of the flange 75, housing 36 and the pair of side walls 99 of the drive shaft housing 19. Flange 75 and housing 36 form a dam to create the reservoir $R_1$.

The narrow slits 101 allow a continuous amount of water to leak into a forward chamber 103. A pair of notches 105 in the upper sides of upper plate 33 define the liquid level $L_1$, and provide a lesser barrier to a given liquid level higher than level $L_1$ and therefore prevent cooling water rising to a level greater than level $L_1$. Cooling water wettably cools housing 36 as it flows around housing 36 and through slits 101. This constant cooling keeps the annularly cylindrically shaped elastomeric bushing 41 from rising to a temperature which would cause it to degrade.

Cooling water falling downward into forward chamber 103 forms a reservoir $R_2$ having a liquid level $L_2$. Forward chamber 103 maintains liquid level $L_2$ at the level of the bottom of spillway slot 106. Water flowing through spillway slot 106 returns to the body of surrounding water in which outboard motor 11 operates.

In addition, the cooling water in forward chamber 103 escapes downwardly through a pair of clearance apertures 107, which surround drive shaft 55 and conduit 58 where the cooling water comes into contact with and cools water pump 57. A forward opening aperture 109 provides an exit for cooling water which entered through clearance apertures 107.

In addition to the path for cooling water flow just described, an additional path also exists. From the bottom of reservoir $R_1$, the pair of apertures 81, one each on the port and starboard sides, provide a downward drainage path. Apertures 81 exist between the upper end 65 of exhaust pipe 59 and the circumferentially outwardly disposed slots 77 about which sealing member 79 extends. Apertures 81 communicate with annular space 93 between expansion chamber 73 and the vertical dividing and vertical end walls and side walls 89, 91, and 99, respectively. In this manner, some of the cooling water cools the expansion chamber 73 and provides a noise absorbing barrier. Some of the energy from the noise generated in the expansion chamber expends energy on the cooling water in annular space 93, and is attenuated.

Figure 6:
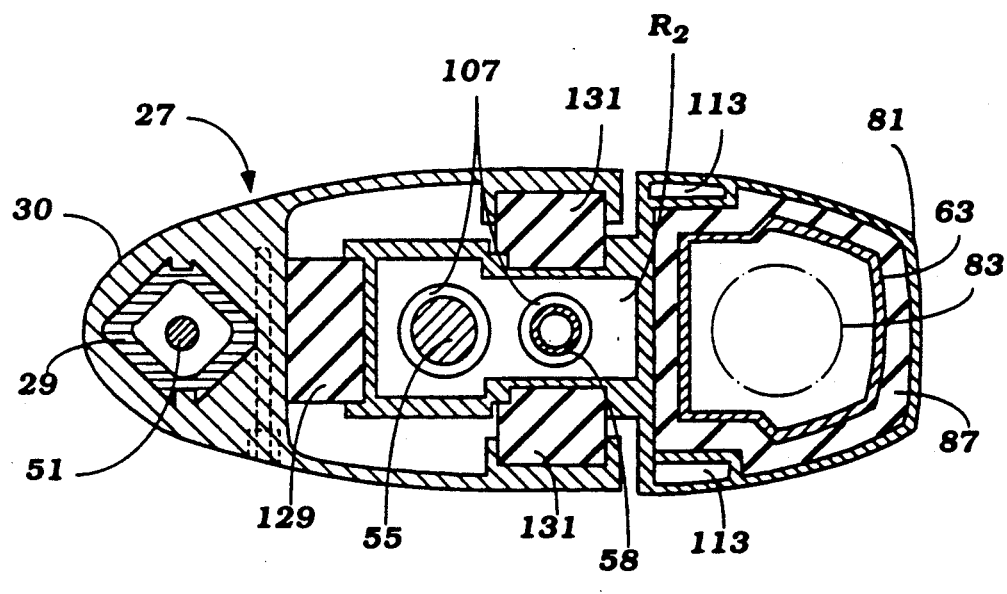
FIG. 6 is an enlarged cross sectional view taken along line 6—6 of FIG. 1.
Figure 7:
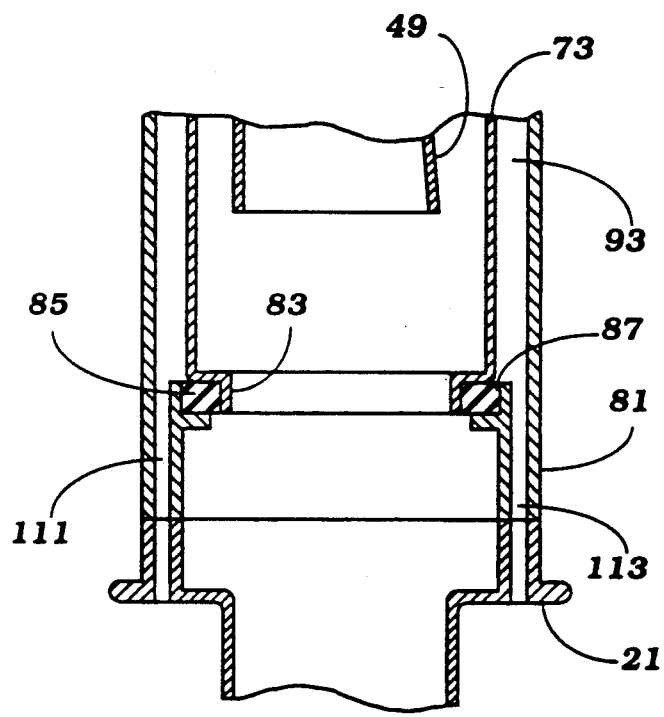
FIG. 7 is an enlarged cross sectional view taken along line 7—7 of FIG. 1.

From the annular space 93, the cooling water drains into a pair of somewhat rectangular cross sectional area slots 111 and 113, one each on the port and starboard side of outboard motor 11, and which are best illustrated with reference to FIG. 6. Slots 111 and 113 communicate with the atmosphere as shown in FIG. 7, and provide a drainage point back into the surrounding water in which outboard 11 operates.

Exhaust gases emanating from exhaust pipe 59 enter the expansion chamber area generally designated by the numeral 115. Exhaust gas noise is attenuated due to the expansion from exhaust pipe 59 into the expansion chamber area 115, as well as the existence of annular space 93. During high speed operation, the exhaust gases from expansion chamber area 115 continue downward into a high speed exhaust gas discharge, through a path indicated generally by dashed lines and referred to generally by the numeral 117. High speed exhaust gas discharge path 117 terminates through the center hub of propeller 23 and is discharged into the surrounding water in a well known manner.

When internal combustion engine 15 is idling or running at very low speed, the volume of exhaust gas passing through exhaust pipe 59 is greatly diminished. However, during idling and very low speed operation, the outboard motor 11 is submerged normally to such a point that the surrounding water travels back into the high speed exhaust gas discharge path 117 and prevents the escape therethrough of exhaust gases and increases the back pressure on internal combustion engine 15. Consequently, a low speed exhaust gas discharge is provided.

Near the upper portion of exhaust pipe 59, the low speed exhaust gas aperture 67 allows smaller amounts of exhaust gases to flow downwardly through exhaust pipe 59 and then upwardly through the annular space between exhaust pipe 59 and expansion chamber 73 and into the low speed exhaust gas aperture 67. From exhaust gas aperture 67, and with particular reference to FIGS. 1, 2 and 5, the exhaust gases enter a first low speed expansion chamber 119. From the first low speed expansion chamber 119 the exhaust gases pass through an aperture 121 and into a second low speed exhaust gas expansion chamber 123. From the second low speed exhaust gas expansion chamber 123, the exhaust gases, through a path not completely shown, indicated by a dashed line arrow in FIG. 1, communicate with a third low speed exhaust gas expansion chamber 125. The exhaust gas then exits third low speed exhaust gas expansion chamber 125 through an aperture 127, where it is emitted into the surrounding atmosphere.

Other structures on outboard motor 11 are specifically designed to attenuate engine noise and to inhibit the transmission of engine noise to transom 47. Rubber support 129 at the forward side of drive shaft 55, and rubber supports 131 at the sides of drive shaft 55 assist in attenuating noises and vibrations from the aft portion of the drive shaft housing 19.

Note that, especially with regard to FIG. 6, the portions of reservoir $R_2$ below the liquid level $L_2$ are adjacent the rubber supports 129 and 131. In this manner, the rubber support 129 and especially rubber supports 131 are further isolated from heat transmitted from the exhaust path.

Aside from the details of operation of the first embodiment of FIGS. 1-7, which have been discussed in some detail, the configuration of the first embodiment with regard to construction is also important. With reference to FIG. 1, note that in assembly, the expansion chamber 73 with its sealing member 79 attached would be fitted inside the drive shaft housing 19 with its sealing member 87 attached. The flange 75 of the expansion chamber 73 would then be bolted with housing 36 to the block 37 of the drive shaft housing 19.

Upon completion of assembly of the power head 13, with the flange 63 and its associated exhaust pipe 59 bolted thereto with bolts 69, the power head 13 would be mounted atop drive shaft housing 19 with the exhaust pipe 59 inserted linearly into the expansion chamber 115 area. The sealing member 71 would have been already placed around exhaust pipe 59 or the upper end, or about the aperture at the upper end of the expansion chamber 73. Note also in the operation of the first embodiment, none of the cooling water is available to wet the portion of the exhaust pipe 59 within the expansion chamber area.

Figure 8:
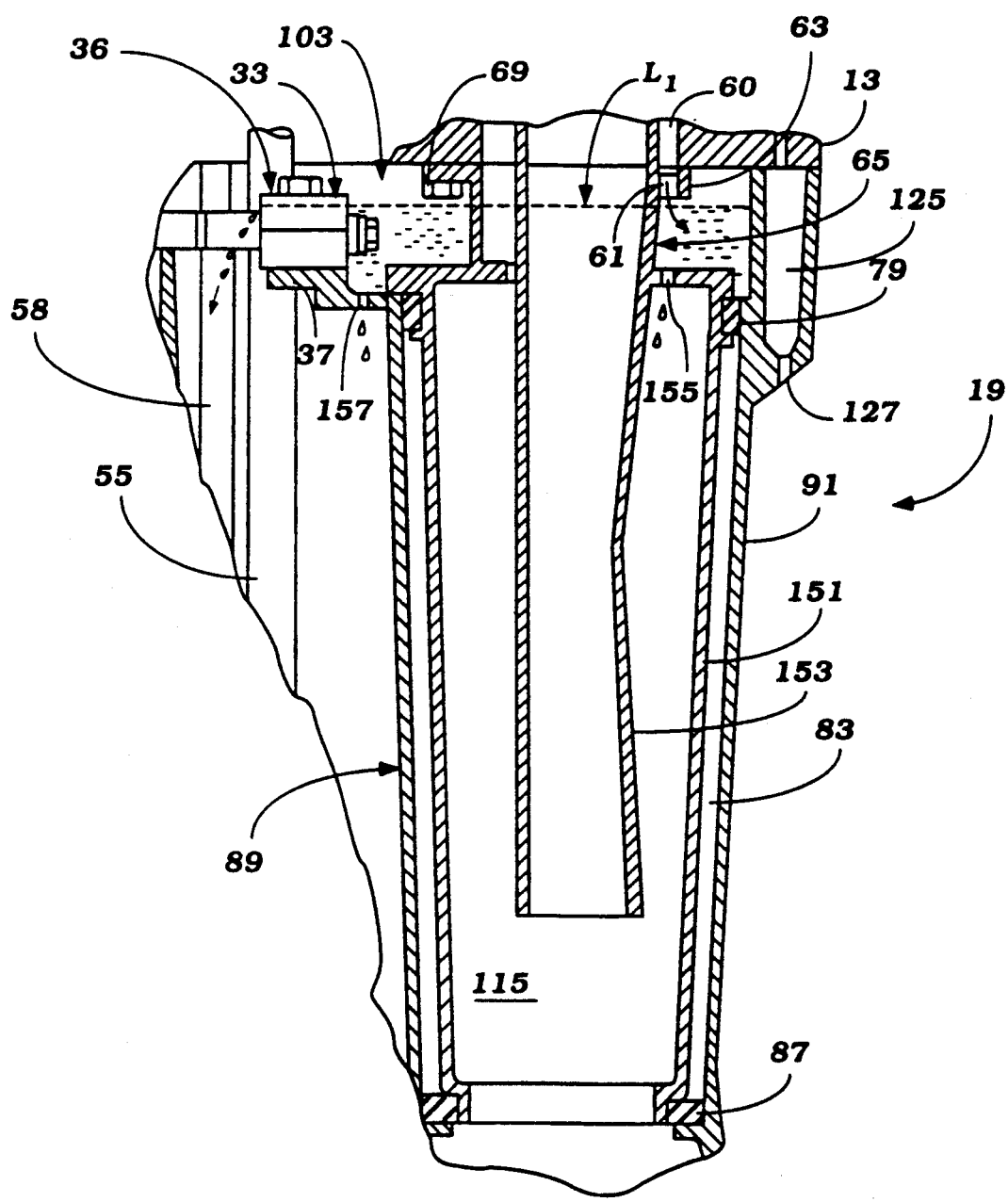
FIG. 8 is an enlarged side elevational view of a second embodiment of the outboard motor of the present invention; and, FIG. 9 is a side elevational view of a third embodiment of the outboard motor of the present invention.

Referring to FIG. 8, an enlarged view of the expansion chamber area of the outboard motor 11 of a second embodiment of the present invention is illustrated. Those structural aspects identical to the first embodiment of FIGS. 1-7 will not be discussed. An expansion chamber assembly 151 is a one piece structure which includes the structures associated with the expansion chamber 73, flange 63, and exhaust pipe 59 of the first embodiment. Expansion chamber assembly 151 does not have a structure such as the flange 75 of the first embodiment. The bolts 69 join the expansion chamber assembly 151 to the power head 13.

Since expansion chamber assembly 151 is continuous with an exhaust pipe structure 153, it is contemplated that some provision be made for attachment of the upper end of the exhaust pipe structure 153 to internal combustion engine 15 contemporaneous with the attachment of expansion chamber assembly 151 to power head 13 by bolts 69. After the exhaust pipe structure 153 is attached to internal combustion engine 15, the engine 15 and the upper end of the drive shaft housing 19 are connected contemporaneous with the insertion of expansion chamber assembly 153 into drive shaft housing 19.

The upper end of expansion chamber assembly 151 is provided with weep holes 155, in communication with the cooling water reservoir $R_1$, which allow cooling water to drip into the expansion chamber area 115, and onto the exhaust pipe structure 153. Cooling water is also allowed to wet the inner walls of expansion chamber assembly 151, and exit the outboard motor 11 of the present invention through the high speed exhaust gas discharge path 117 of FIG. 1.

Vertical dividing wall 89 is continuous with block 37. Between the vertical dividing wall 89 and block 37 are provided weep holes 157 which further permit cooling water to enter forwardly of annular space 93, as was the case in the first embodiment. Cooling water from the reservoir $R_1$ overflows into forward chamber 103 in the same manner as the first embodiments of FIGS. 1-7.

Figure 9:
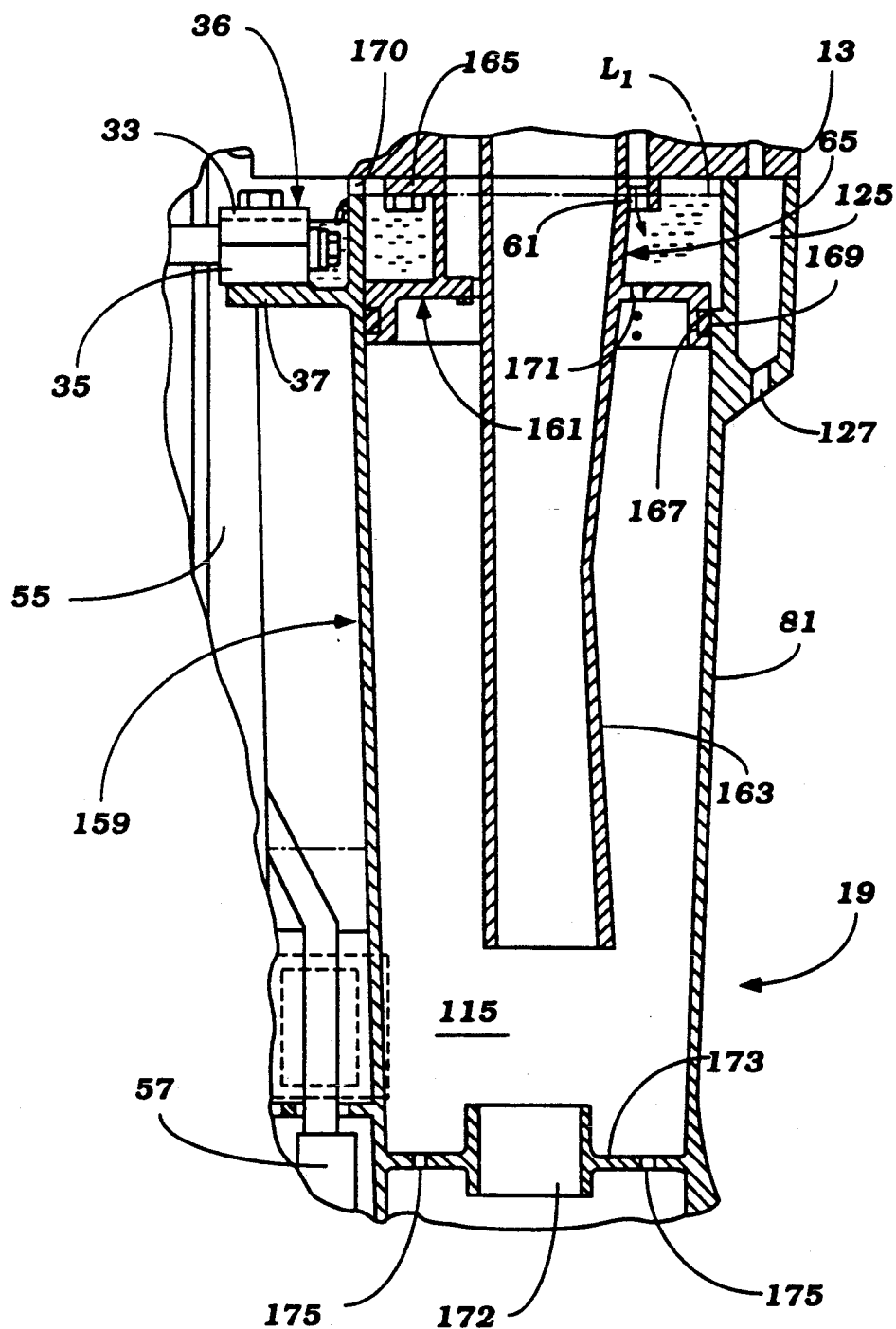

Referring to FIG. 9, an enlarged view of the expansion chamber area of the outboard motor 11 of a third embodiment of the present invention is illustrated. Again, those structural aspects identical to the first and second embodiments of FIGS. 1-8 will not be discussed. An expansion chamber existing apart from the drive shaft housing 19 does not exist in the embodiment of FIG. 9, and consequently neither does the annular space 93. The expansion chamber is formed integrally with drive shaft housing 19, the expansion chamber area 115 existing within and surrounded by the drive shaft housing 19 structure. The vertical end wall 91 and an integral vertical dividing wall 159 form the boundaries of the expansion chamber area 115.

An exhaust pipe and flange assembly 161 is a one piece assembly including an exhaust pipe structure 163, an upper flange portion 165, and a circumferentially outwardly disposed slot 167 supporting a sealing member 169. Since exhaust pipe and flange assembly 161 is continuous with an exhaust pipe structure 163, it is contemplated that the exhaust pipe and flange assembly 161 is to be attached to the internal combustion engine 15 and power head 13 simultaneously. The bolts 69 join the exhaust pipe and flange assembly 161 to the power head 13.

The horizontal portion of exhaust pipe and flange assembly 161 is provided with weep holes 171, in communication with the cooling water reservoir $R_1$, which allow cooling water to drip into the expansion chamber area 115, and onto the exhaust pipe structure 163. Cooling water is also allowed to wet the vertical end wall 91 and integral vertical dividing wall 159 both of which together form the boundaries of the expansion chamber area 115.

Similar to the second embodiment, the cooling water within expansion chamber area 115 exits the outboard motor 11 of the present invention through the high speed exhaust gas discharge path 117 of FIG. 1.

Cooling water from the reservoir $R_1$ overflows through a slot 170 at the top of vertical dividing wall 159, before overflowing into an area between vertical dividing wall 159 and housing 36. Cooling water then flows into forward chamber 103 in the same manner as the first embodiments of FIGS. 1-7.

At the lower end of the expansion chamber area 115, and continuous with the vertical end wall 91 and integral vertical dividing wall 159 of drive shaft housing 19, is a pipe section 172 supported by a plate 173. Plate 173 has apertures 175 to enable drainage of cooling water falling between the pipe section 172 and either one of the vertical end wall 91 or integral vertical dividing wall 159. The plate 173 and pipe section 172 provides a partial barrier along the high speed gas discharge path 117 to assist in silencing and cooling the exhaust gasses.

It should be readily apparent from the foregoing description that the embodiments of the present invention provide advantageous methods of cooling and silencing the exhaust gasses of an outboard motor. In particular are the advantages derivable from cooling about the exhaust gas path particularly at points of transition from the power head 13 to the drive shaft housing 19 and adjacent the points of attachment of drive shaft housing 19 to upper steering plate 25. The three embodiments represent variations on the construction and operation of such a cooling structure and method, and it is contemplated that further modifications may be made with respect to the structures and manner of operation of the embodiments described herein without departing from the spirit and scope of the invention.

What is claimed is:

1. In an outboard motor comprising a power head including a water cooled internal combustion engine, a drive shaft housing depending from said power head and containing a drive shaft driven by said engine, and a lower unit depending from said drive shaft housing and supporting a propeller adapted to be driven by said drive shaft, a swivel bracket journaling a steering shaft, vibration damping means between said steering shaft and said drive shaft housing for affixing said steering shaft to said drive shaft housing, the improvement comprising the connection of said vibration damping means to said drive shaft housing forming the forward wall of a first cooling water reservoir, means for delivering cooling water from said engine to said water reservoir, said forward wall being provided with means for permitting water to pass said forward wall for discharge from said water reservoir into a lower area of said drive shaft housing for cooling said vibration damping means by a flow of water when said engine is operating.

2. The outboard motor of claim 1 wherein said vibration damping means further comprises a pair of annularly cylindrical shaped elastomeric members attached to said steering shaft through their inner surfaces and attached to said drive shaft housing about their outer surfaces.

3. The outboard motor of claim 1 further comprising a second cooling water reservoir receiving cooling water from said first cooling water reservoir, and lower vibration damping means adjacent said second cooling water reservoir and cooled by said second cooling water reservoir.

4. The outboard motor of claim 1 further comprising an exhaust pipe attached to said internal combustion engine, and extending into an expansion chamber formed in said drive shaft housing, said expansion chamber being contiguous to at least some of said vibration damping means.

5. The outboard motor of claim 4 further comprising sealing means for sealing contact between said expansion chamber and said exhaust pipe, and wherein said expansion chamber, said sealing means and said exhaust pipe further define said reservoir.

6. The outboard motor of claim 5 wherein said vibration damping means further comprises a pair of annularly cylindrical shaped elastomeric members attached to said steering shaft through their inner surfaces and attached to said drive shaft housing about their outer surfaces.

7. The outboard motor of claim 5 further comprising a second cooling water reservoir receiving cooling water from said first cooling water reservoir, and lower vibration damping means adjacent said second cooling water reservoir and cooled by said second cooling water reservoir.

8. The outboard motor of claim 7 wherein the exhaust pipe is encircled by and cooled by the first cooling water reservoir.

9. The outboard motor of claim 5 wherein an annular space separates said expansion chamber and said driveshaft housing.

10. The outboard motor of claim 9 wherein said annular space is wettably cooled with cooling water.

11. The outboard motor of claim 10 wherein said reservoir is in communication with said annular space through at least one weep hole.

12. The outboard motor of claim 4 wherein the exhaust pipe is encircled by and cooled by the first cooling water reservoir.

* * * * *